(12) United States Patent
Floyd et al.

(10) Patent No.: US 9,347,355 B2
(45) Date of Patent: May 24, 2016

(54) IN-LINE FLOW DIVERTER

(71) Applicant: Tenneco Automotive Operating Company Inc., Lake Forest, IL (US)

(72) Inventors: Ryan A. Floyd, Mason, MI (US); John M. Lowry, Brooklyn, MI (US); Larry J. Geer, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/193,499

(22) Filed: Feb. 28, 2014

(65) Prior Publication Data

US 2014/0178264 A1     Jun. 26, 2014

Related U.S. Application Data

(63) Continuation-in-part of application No. 13/227,952, filed on Sep. 8, 2011, now Pat. No. 8,677,738.

(51) Int. Cl.
*F01N 3/00* (2006.01)
*F01N 3/20* (2006.01)

(52) U.S. Cl.
CPC ........... *F01N 3/2066* (2013.01); *F01N 2240/20* (2013.01); *F01N 2610/146* (2013.01); *Y02T 10/24* (2013.01)

(58) Field of Classification Search
CPC ....... F01N 9/002; F01N 3/0842; F01N 3/035; F01N 13/02; F01N 13/10; F01N 2240/20; F01N 1/166; F02D 41/029
USPC ............................ 60/295, 301, 303, 323, 324
See application file for complete search history.

(56) References Cited

U.S. PATENT DOCUMENTS

| | | | |
|---|---|---|---|
| 3,958,757 A | 5/1976 | Happel et al. | |
| 4,292,947 A | 10/1981 | Tanasawa et al. | |
| 4,742,964 A | 5/1988 | Ito et al. | |
| 4,805,837 A | 2/1989 | Brooks et al. | |
| 5,307,997 A | 5/1994 | Wakeman | |
| 5,339,630 A * | 8/1994 | Pettit | 60/303 |
| 5,406,790 A | 4/1995 | Hirota et al. | |
| 5,522,218 A | 6/1996 | Lane et al. | |
| 5,570,841 A | 11/1996 | Pace et al. | |
| 5,605,042 A | 2/1997 | Stutzenberger | |
| 5,713,327 A | 2/1998 | Tilton et al. | |
| 5,924,280 A | 7/1999 | Tarabulski | |
| 5,976,475 A | 11/1999 | Peter-Hoblyn et al. | |
| 6,063,350 A | 5/2000 | Tarabulski et al. | |

(Continued)

FOREIGN PATENT DOCUMENTS

| | | |
|---|---|---|
| DE | 2418227 | 10/1975 |
| DE | 10241697 | 4/2003 |

(Continued)

*Primary Examiner* — Patrick Maines
(74) *Attorney, Agent, or Firm* — Harness, Dickey & Pierce, P.L.C.

(57) ABSTRACT

An exhaust gas treatment system for reducing emissions from an engine includes an exhaust conduit adapted to supply an exhaust stream from the engine to an exhaust treatment device. The conduit includes an aperture. An injector injects a reagent through the aperture and into the exhaust stream. A flow modifier is positioned within the exhaust conduit upstream of the injector. The flow modifier includes a diverter for increasing the velocity of the exhaust gas at a predetermined location within the conduit relative to the injected reagent.

15 Claims, 8 Drawing Sheets

(56) References Cited

U.S. PATENT DOCUMENTS

| | | |
|---|---|---|
| 6,470,676 B2 | 10/2002 | Dolling et al. |
| 6,539,708 B1 | 4/2003 | Hofmann et al. |
| 6,604,850 B1 * | 8/2003 | Schneider et al. ......... 366/175.2 |
| 6,623,155 B1 * | 9/2003 | Baron .................. B01F 5/0611 |
| | | 366/181.5 |
| 6,708,904 B2 | 3/2004 | Itatsu |
| 6,742,330 B2 | 6/2004 | Genderen |
| 7,100,366 B2 | 9/2006 | Hager et al. |
| 7,152,396 B2 | 12/2006 | Cheng |
| 7,434,570 B2 | 10/2008 | Hill |
| 7,509,799 B2 | 3/2009 | Amou et al. |
| 7,775,322 B2 | 8/2010 | Hill |
| 8,006,487 B2 | 8/2011 | Gaiser |
| 8,033,101 B2 | 10/2011 | Amon et al. |
| 8,047,452 B2 | 11/2011 | Martin et al. |
| 8,114,364 B2 | 2/2012 | Harinath et al. |
| 8,141,353 B2 | 3/2012 | Zheng et al. |
| 8,196,388 B2 | 6/2012 | Park et al. |
| 8,215,103 B2 | 7/2012 | Hill |
| 8,240,137 B2 | 8/2012 | Liu et al. |
| 8,302,383 B2 * | 11/2012 | Oesterle ................ F01N 3/206 |
| | | 60/286 |
| 8,468,813 B2 | 6/2013 | Hill et al. |
| 8,621,846 B2 | 1/2014 | Thomas |
| 2002/0001554 A1 | 1/2002 | Czarnak et al. |
| 2003/0226412 A1 | 12/2003 | Rumminger et al. |
| 2006/0070374 A1 | 4/2006 | Gaiser et al. |
| 2007/0101703 A1 * | 5/2007 | Kanaya et al. .................. 60/286 |
| 2008/0083218 A1 | 4/2008 | Abram et al. |
| 2008/0134671 A1 * | 6/2008 | Nefischer ............... B01D 53/90 |
| | | 60/300 |
| 2008/0245063 A1 | 10/2008 | Hill |
| 2009/0019842 A1 * | 1/2009 | Suzuki et al. .................. 60/301 |
| 2009/0019843 A1 * | 1/2009 | Levin .................. B01F 3/04049 |
| | | 60/303 |
| 2009/0179087 A1 | 7/2009 | Martin et al. |
| 2009/0241906 A1 | 10/2009 | Osbat et al. |
| 2009/0262599 A1 * | 10/2009 | Kohrs .................. B01F 5/0643 |
| | | 366/337 |
| 2009/0266064 A1 | 10/2009 | Zheng et al. |
| 2010/0005790 A1 * | 1/2010 | Zhang .............................. 60/301 |
| 2010/0005791 A1 | 1/2010 | Ranganathan et al. |
| 2010/0107614 A1 | 5/2010 | Levin et al. |
| 2010/0212292 A1 | 8/2010 | Rusch et al. |
| 2010/0263359 A1 * | 10/2010 | Haverkamp et al. ............ 60/303 |
| 2011/0061969 A1 | 3/2011 | Hill et al. |
| 2011/0258983 A1 * | 10/2011 | Vosz .............................. 60/274 |
| 2013/0164182 A1 * | 6/2013 | Iijima et al. .................... 422/169 |
| 2013/0188444 A1 * | 7/2013 | Palmer .................. B01F 5/0473 |
| | | 366/337 |
| 2015/0040537 A1 * | 2/2015 | Hicks et al. .................... 60/273 |
| 2015/0044103 A1 * | 2/2015 | Sampath et al. .............. 422/168 |

FOREIGN PATENT DOCUMENTS

| | | | |
|---|---|---|---|
| DE | 102005052064 A1 * | 5/2007 | ............ F01N 3/2066 |
| EP | 0711609 | 5/1996 | |
| EP | 1111231 | 6/2001 | |
| EP | 2342434 | 8/2012 | |
| JP | 11-166410 | 6/1999 | |
| JP | 2003-328735 | 11/2003 | |
| JP | 2004-324585 | 11/2004 | |
| JP | 2007-332797 | 12/2007 | |
| JP | 4930796 | 5/2012 | |
| WO | WO 2007/110575 | 10/2007 | |
| WO | WO 2008061593 A1 * | 5/2008 | ............. B01F 3/022 |
| WO | WO2008/080695 | 7/2008 | |

* cited by examiner

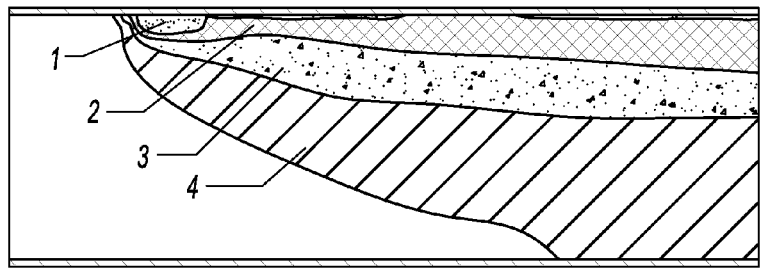
Mass Fraction of Reagent ( No Flow Modifier )

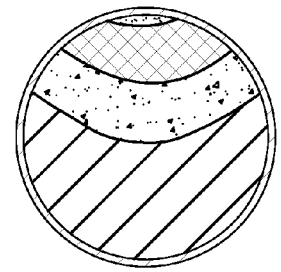
Fig-5

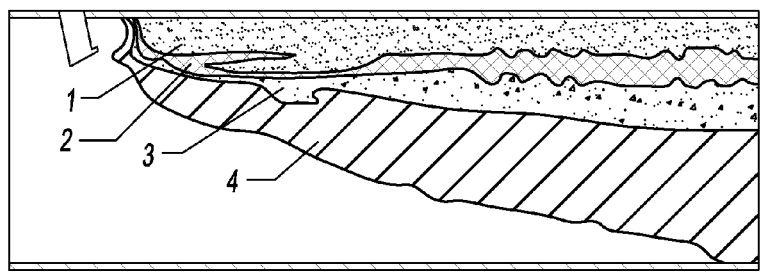
Mass Fraction of Reagent ( With Flow Modifier )

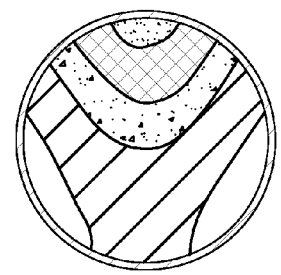
Fig-7

▨ Area 1 ($6.4 \times 10^{-4}$ - $8.0 \times 10^{-4}$)   ▨ Area 3 ($3.2 \times 10^{-4}$ - $5.2 \times 10^{-4}$)
▨ Area 2 ($5.2 \times 10^{-4}$ - $6.4 \times 10^{-4}$)   ▨ Area 4 ($1.2 \times 10^{-4}$ - $3.2 \times 10^{-4}$)

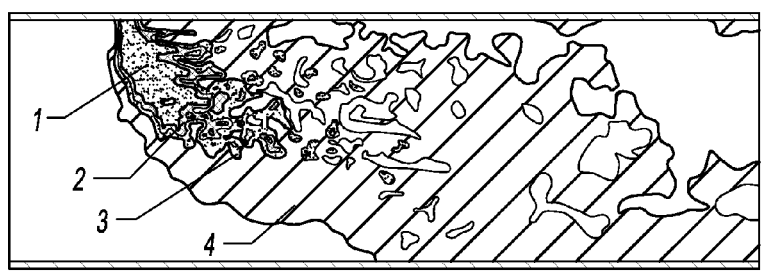
Simulated Spray Concentration of Droplets ( No Flow Modifier )

Fig-6

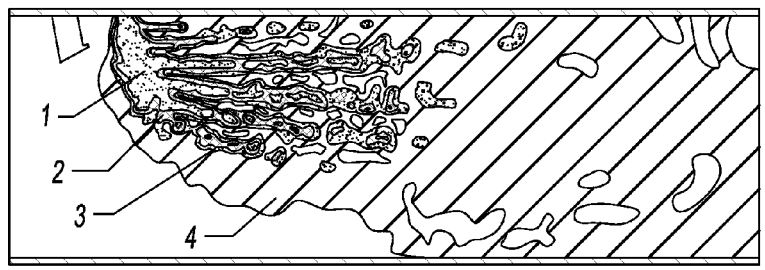
Simulated Spray Concentration of Droplets ( With Flow Modifier )

Fig-8

▨ Area 1 ($8.5 \times 10^{-3}$ - $1.0 \times 10^{-2}$)   ▨ Area 3 ($4.0 \times 10^{-3}$ - $6.5 \times 10^{-3}$)
▨ Area 2 ($6.5 \times 10^{-3}$ - $8.5 \times 10^{-3}$)   ▨ Area 4 ($1.0 \times 10^{-3}$ - $4.0 \times 10^{-3}$)

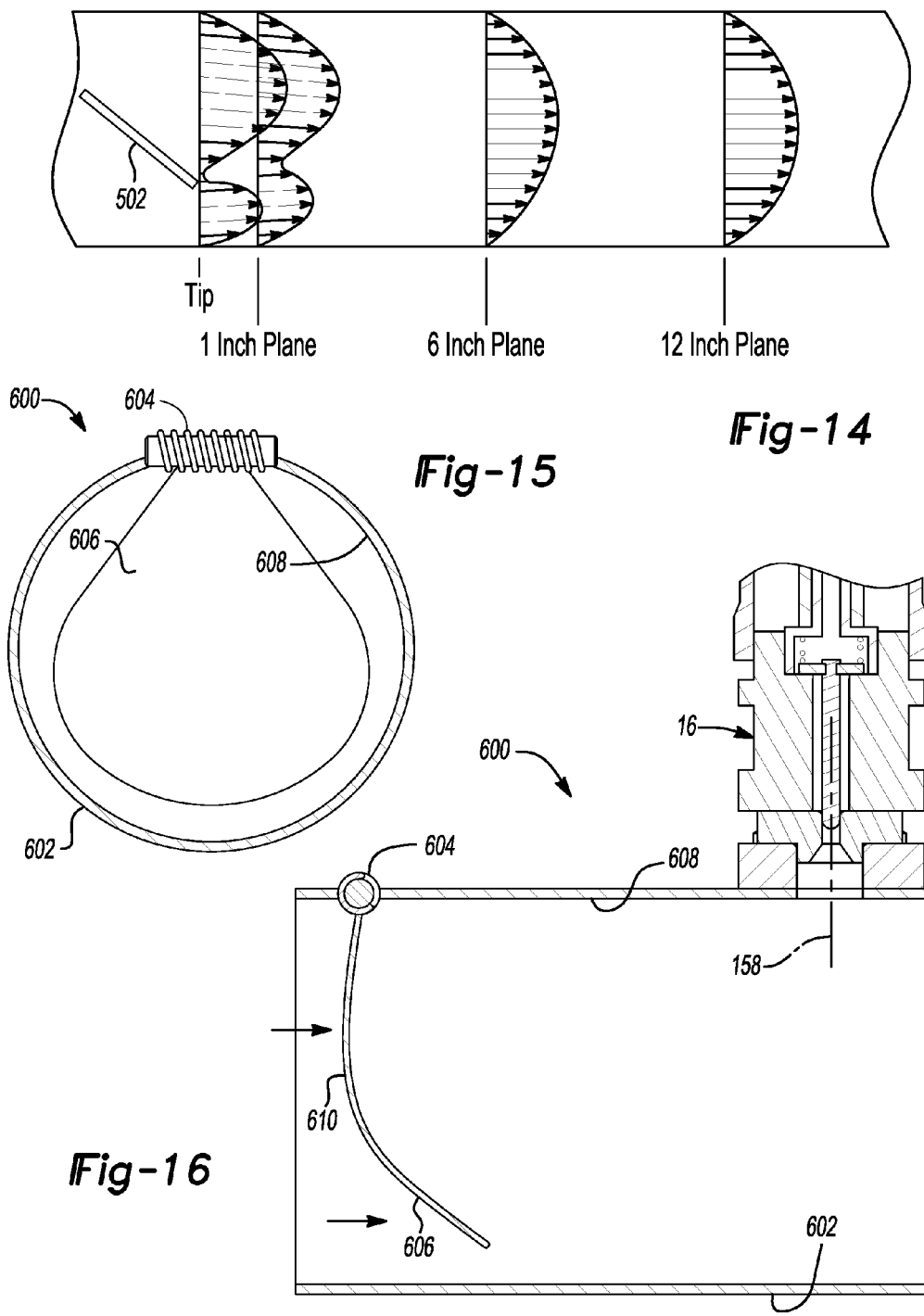

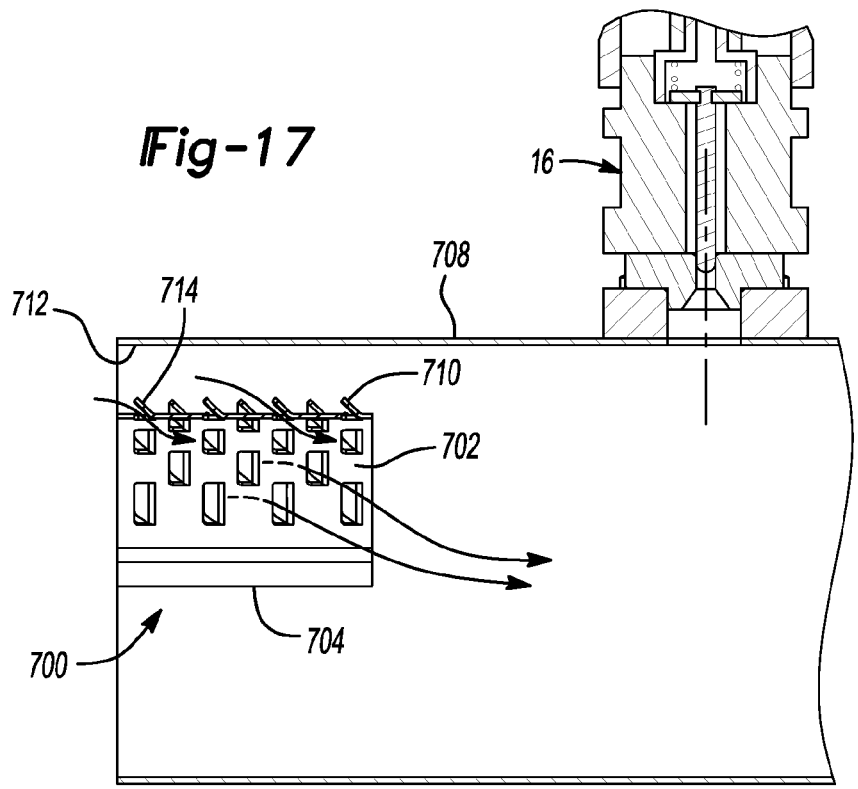
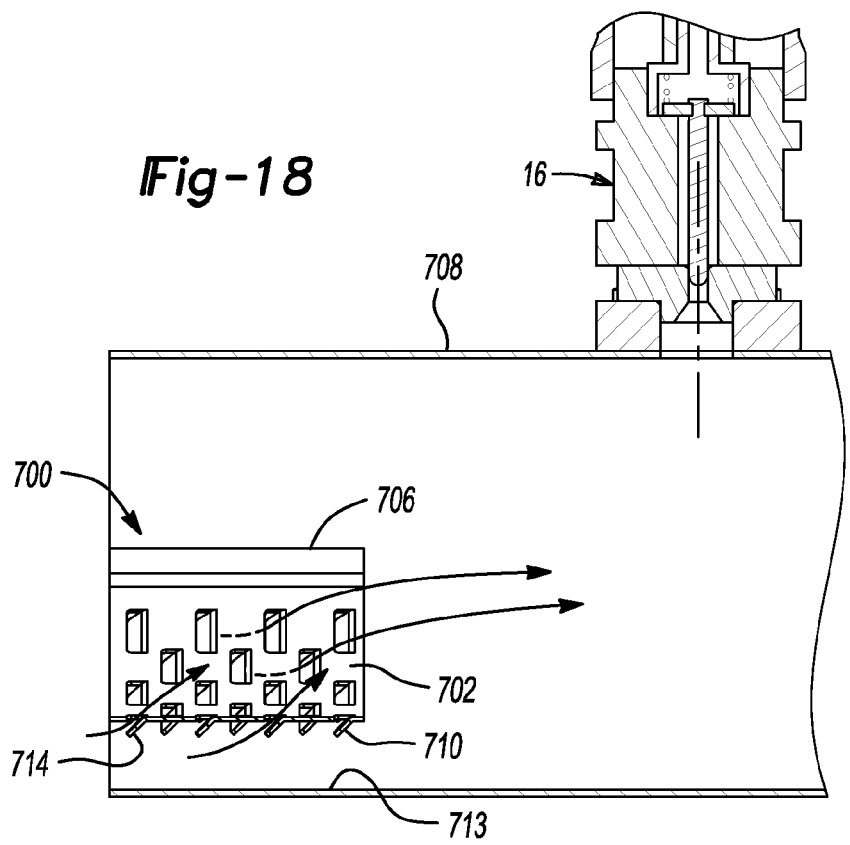

IN-LINE FLOW DIVERTER

CROSS-REFERENCE TO RELATED APPLICATIONS

This application is a continuation-in-part of U.S. patent application Ser. No. 13/227,952 filed on Sep. 8, 2011. The entire disclosure of the above application is incorporated herein by reference.

FIELD

The present disclosure relates to exhaust gas treatment systems. More particularly, an exhaust gas flow modifier is provided upstream from a reagent injector to enhance fixing and distribution of the reagent within the engine exhaust stream.

BACKGROUND

This section provides background information related to the present disclosure which is not necessarily prior art.

To reduce the quantity of undesirable particulate matter and $NO_x$ emitted to the atmosphere during internal combustion engine operation, a number of exhaust aftertreatment systems have been developed. The need for exhaust aftertreatment systems particularly arises when diesel combustion processes are implemented.

One method used to reduce $NO_x$ emissions from internal combustion engines is known as selective catalytic reduction (SCR). SCR may include injecting a reagent into the exhaust stream of the engine to form a reagent and exhaust gas mixture that is subsequently passed through a reactor containing a catalyst, such as, activated carbon, or metals, such as platinum, vanadium, or tungsten, which are capable of reducing the $NO_x$ concentration in the presence of the reagent.

An aqueous urea solution is known to be an effective reagent in SCR systems for diesel engines. However, use of an aqueous solution and other reagents may include disadvantages. Urea is highly corrosive and attacks mechanical components of the SCR system. Urea also tends to solidify upon prolonged exposure to high temperatures, such as encountered in diesel exhaust systems. A concern exists because the reagent that creates a deposit is not used to reduce the $NO_x$.

In addition, if the reagent is not properly mixed with the exhaust gas, the reagent is not efficiently utilized, inhibiting the action of the catalyst and thereby reducing the SCR system's effectiveness. High reagent injection pressures have been used as a method of minimizing the problem of insufficient atomization of the urea mixture. However, high injection pressures may result in over-penetration of the injected spray plume into the exhaust stream thereby causing the plume to impinge on the inner surface of the exhaust pipe opposite the injector. Over-penetration leads to inefficient use of the urea mixture and may reduce the range over which the vehicle may be operated with reduced NO emissions. Only a finite amount of reagent may be carried in a vehicle. It is desirable to efficiently use the stored reagent to maximize vehicle range and reduce the need for replenishing the reagent.

It may be advantageous to provide methods and apparatus for injecting a reagent into the exhaust stream of an internal combustion engine to minimize reagent deposition and improve the mixing of the reagent with the exhaust gas.

SUMMARY

This section provides a general summary of the disclosure, and is not a comprehensive disclosure of its full scope or all of its features.

An exhaust gas treatment system for reducing emissions from an engine includes an exhaust conduit adapted to supply an exhaust stream from the engine to an exhaust treatment device. The conduit includes an aperture. An injector injects a reagent through the aperture and into the exhaust stream. A flow modifier is positioned within the exhaust conduit upstream of the injector. The flow modifier includes a diverter for increasing the velocity of the exhaust gas at a predetermined location within the conduit relative to the injected reagent.

An exhaust gas stream flow modifier is provided for an exhaust gas treatment system including an exhaust conduit and an injector for injecting a reagent into an exhaust stream. The flow modifier includes a mount adapted to fix the injector to the conduit. The mount includes an aperture through which reagent is injected. A diverter is coupled to one of the mount and the conduit, adapted to be positioned within the conduit, and offset from an inner surface of the conduit. The diverter is positioned upstream from the reagent injection aperture and inclined at an angle to increase a velocity of the exhaust at a predetermined location within the conduit to reduce reagent impingement on the conduit inner surface.

The present disclosure also provides an exhaust gas treatment system for reducing emissions from an engine. The system includes an exhaust treatment device; an exhaust conduit adapted to supply an exhaust stream from the engine to the exhaust treatment device, the conduit including an aperture; an injector for injecting a reagent through the aperture and into the exhaust stream; and a flow modifier positioned within the exhaust conduit proximate the injector. The flow modifier includes a plate having a first end and a second end that are fixed to opposing sides of the exhaust conduit to suspend the plate within the exhaust conduit, and the plate includes a plurality of louvers that direct the exhaust stream in a direction toward or away from the injector.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 depicts a computational fluid dynamics model of the mass fraction of reagent in a conduit without a flow modifier FIG. 6 is a computational fluid dynamics contour depicting a simulated spray concentration of droplets for reagent injected within a conduit without a pre-injection exhaust flow modifier;

FIG. 7 depicts a computational fluid dynamics model of the mass fraction of reagent in a conduit with a flow modifier;

FIG. 8 is a computational fluid dynamics contour depicting a simulated spray concentration of droplets for reagent injected within a conduit with a pre-injection exhaust flow modifier;

FIG. 14 is a graph depicting a velocity profile for the exhaust travelling through a conduit equipped with the flow modifier shown in FIG. 11;

FIG. 15 is a plan view of another alternate flow modifier;

FIG. 16 is a fragmentary cross-sectional side view of the flow modifier shown in FIG. 15;

FIG. 17 is a fragmentary cross-sectional side view of an exhaust conduit including a flow modifier at an upper portion of the conduit according to a principle of the present disclosure;

FIG. 18 is a fragmentary cross-sectional side view of an exhaust conduit including a flow modifier at a lower portion of the conduit according to a principle of the present disclosure;

Corresponding reference numerals indicate corresponding parts throughout the several views of the drawings.

DETAILED DESCRIPTION

Example embodiments will now be described more fully with reference to the accompanying drawings.

It should be understood that although the present teachings may be described in connection with diesel engines and the reduction of $NO_x$ emissions, the present teachings can be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Pat. No. 8,047,452, issued Nov. 1, 2011, entitled "Method And Apparatus For Injecting Atomized Fluids", which is incorporated herein by reference.

Figure 1:
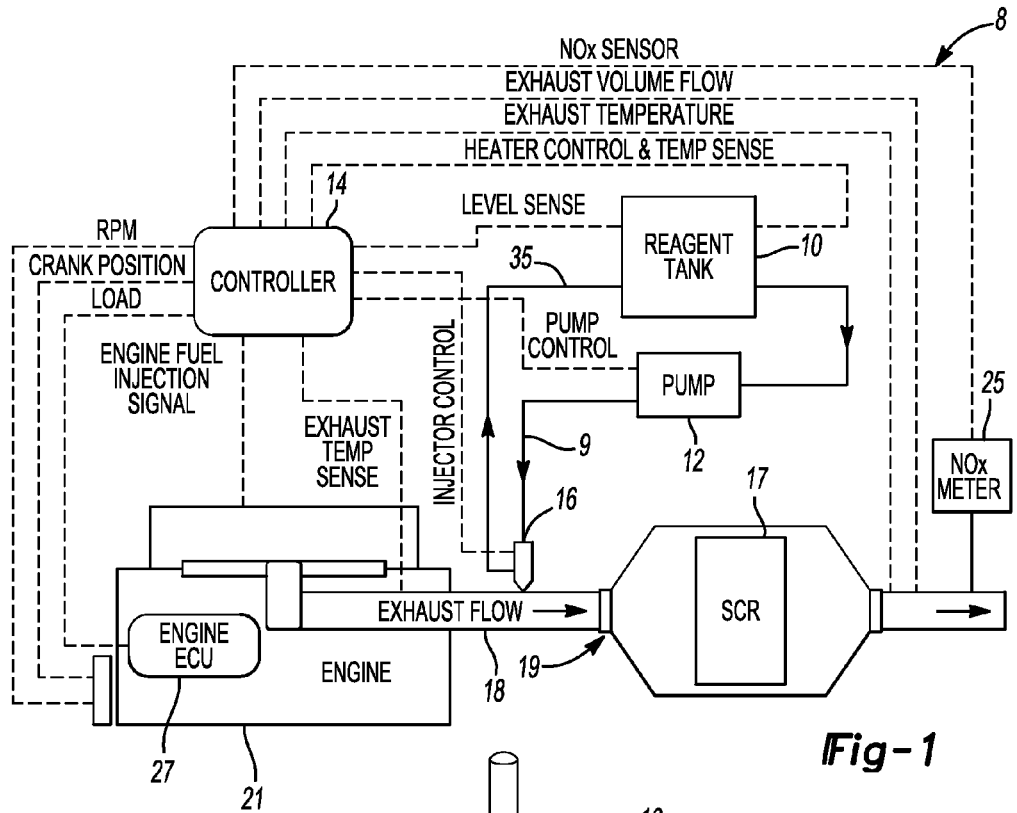
FIG. 1 depicts a schematic diagram of an exemplary internal combustion engine with an emissions control system equipped with a pre-injection exhaust flow modifier according to the present teachings.
Figure 2:
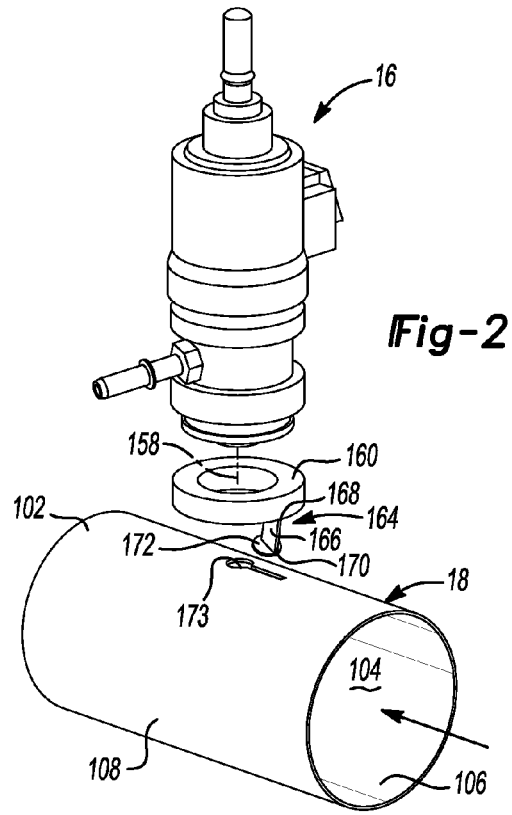
FIG. 2 is an exploded perspective view of an exhaust gas treatment device including a pre-injection exhaust flow modifier.

With reference to the Figures, a pollution control system 8 for reducing $NO_x$ emissions from the exhaust of a diesel engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents can be available in the system and can be used singly or in combination. The tank 10 and delivery module 12 may form an integrated reagent tank/delivery module. Also provided as part of system 8 is an electronic injection controller 14, a reagent injector 16, and an exhaust system 19. Exhaust system 19 includes an exhaust conduit 18 providing an exhaust stream to at least one catalyst bed 17.

The delivery module 12 may comprise a pump that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16. The system may also incorporate various freeze protection strategies to thaw frozen reagent or to prevent the reagent from freezing. During system operation, regardless of whether or not the injector is releasing reagent into the exhaust gases, reagent may be circulated continuously between the tank 10 and the reagent injector 16 to cool the injector and minimize the dwell time of the reagent in the injector so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the injector.

The amount of reagent required may vary with load, exhaust gas temperature, exhaust gas flow, engine fuel injection timing, desired $NO_x$ reduction, barometric pressure, relative humidity, EGR rate and engine coolant temperature. A $NO_x$ sensor or meter 25 is positioned downstream from catalyst bed 17. $NO_x$ sensor 25 is operable to output a signal indicative of the exhaust $NO_x$ content to an engine control unit 27. All or some of the engine operating parameters may be supplied from engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

Referring now to FIGS. 2-8, an exhaust gas treatment assembly 100 is defined to include exhaust conduit 18 and injector 16. Exhaust conduit 18 includes a substantially cylindrical tube 102 defining an exhaust passageway 104. Cylindrical tube 102 includes an inner surface 106 and an outer surface 108.

Injector 16 includes a body 150 defining a cylindrical chamber 152 in receipt of an axially translatable valve member 154. Body 150 includes an exit orifice 156 as a discharge location for injected reagent. A valve seat 146 is formed proximate exit orifice 156 that is selectively engaged by valve member 154 to control reagent injection into the exhaust gas flow path. Valve member 154 is translatable along an axis of reagent injection 158.

A mount 160 is fixed to body 150 and includes a radially outwardly extending flange 162. A flow modifier 164 radially inwardly extends from mount 160 into tube 102 to change the direction of exhaust flow through exhaust passageway 104. A clamp (not shown) or some other suitable coupling device fixes mount 160 to tube 102.

Flow modifier 164 includes a radially inwardly extending post 166 having a first end 168 fixed to mount 160 and an opposite end 170 fixed to a substantially planar diverter plate 172. Diverter plate 172 is positioned at an inclined angle to a direction of exhaust flow passing through tube 102. In the embodiment depicted in FIG. 2, diverter plate 172 includes an elongated oval outer shape.

Flow modifier 164 and mount 160 are shown as a one-piece member that may easily be fixed to tube 102 using typical injector mounting hardware. It is also contemplated that flow modifier 164 may be spaced apart from mount 160, positioned within exhaust passageway 104, and separately fixed to cylindrical tube 102. In the version depicted in FIG. 2, tube 102 includes a keyhole slot 173 shaped to receive flow modifier 164.

Figure 3:
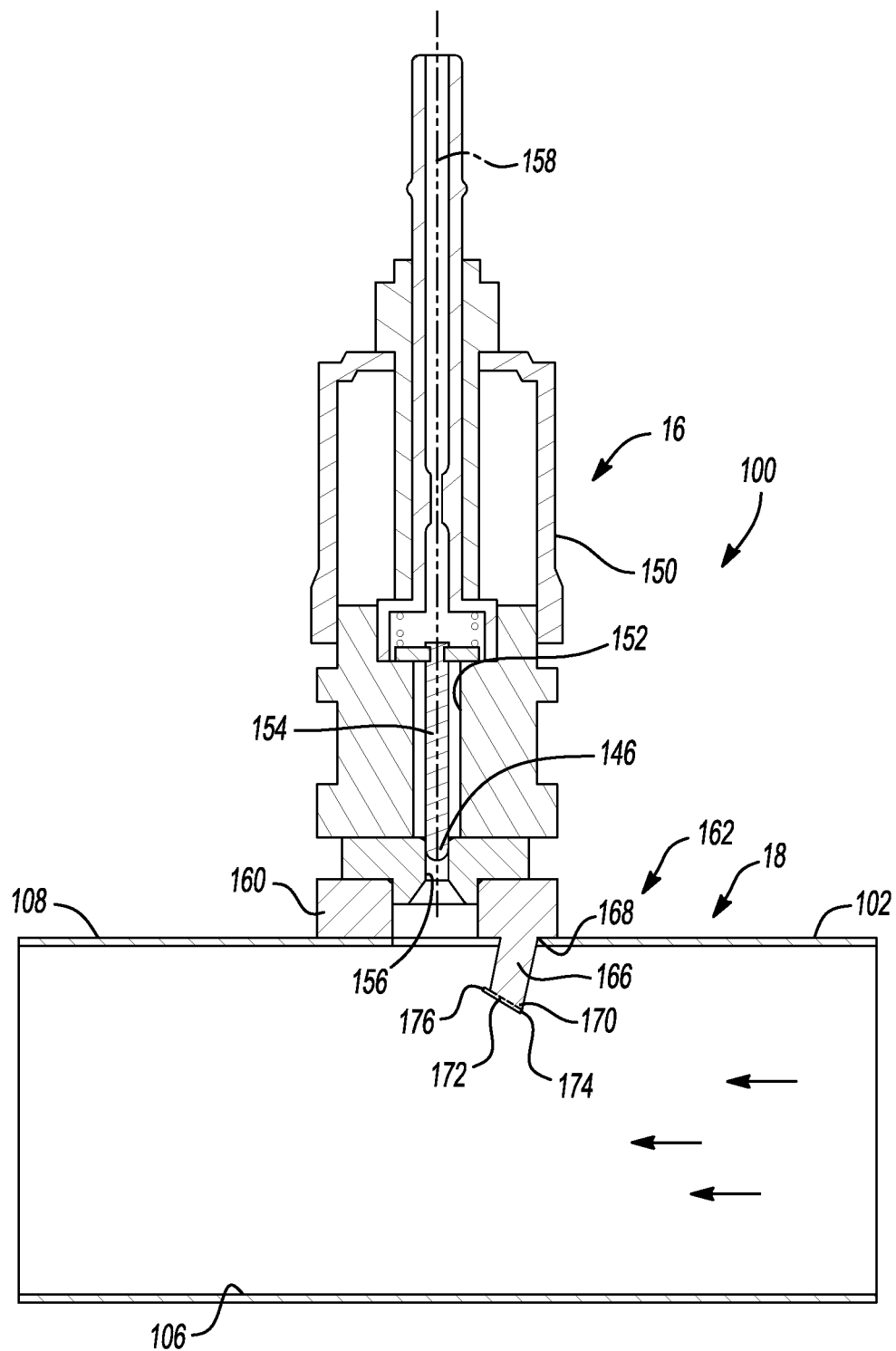
FIG. 3 is a fragmentary cross-sectional side view of the exhaust gas treatment device.
Figure 4:
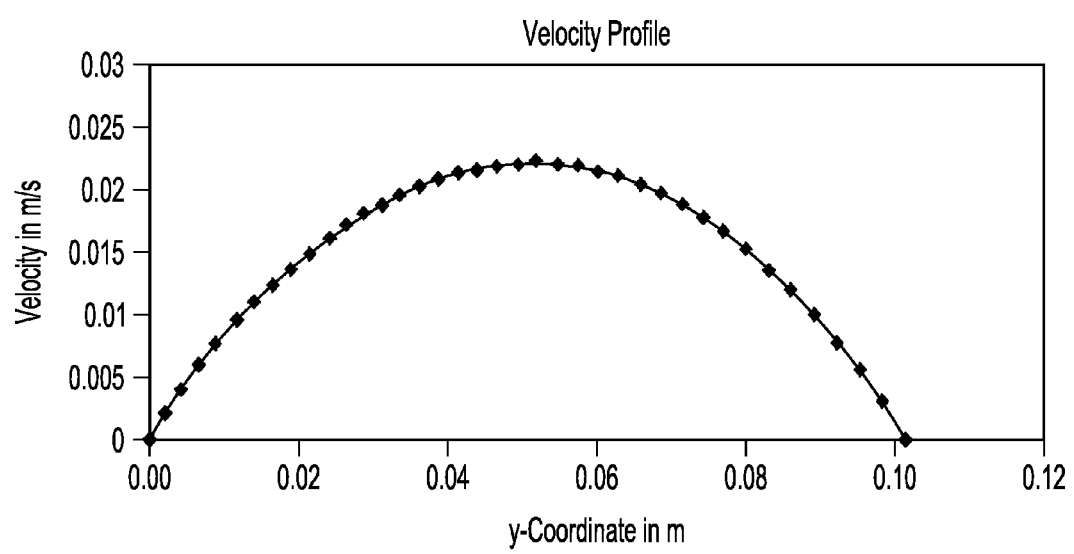
FIG. 4 is a graph depicting an exhaust gas velocity profile through a conduit that is not equipped with a pre-injection modifier.

Flow modifier 164 is positioned upstream from axis of reagent injection 158. Flow modifier 164 is sized, shaped and positioned within passageway 104 to change the velocity profile of the exhaust at a cross-sectional plane taken along reagent injection axis 158. In the absence of a flow modifier, the exhaust flow velocity profile flowing through tube 102 exhibits a substantially symmetrical curved trace increasing to a maximum velocity at the center of passageway 104 with minimal velocity at inner surface 106, as shown in FIG. 4. The velocity of the exhaust gas near inner surface 106 is substantially lower than the exhaust gas velocity in the center of tube 102. When the exhaust flow rate is relatively low, such as when the internal combustion engine is idling, injected reagent tends to pass through the exhaust gas and impinge on inner surface 106 along the lower half of tube 102 (FIG. 3). As previously mentioned, it is desirable to mix the reagent with the exhaust gas and supply the mixture to an exhaust treatment device such as an SCR catalyst. Reagent that impinges on inner surface 106 may tend to adhere to tube 102 causing undesirable pooling, corrosion and possible reagent solidification.

FIG. 5 depicts a computational fluid dynamics contour illustrating a reagent mass fraction distribution during an injection of approximately 4.2 grams per minute with a relatively low exhaust flow rate of approximately 380 kg per hour for an exhaust system without a flow modifier. A simulated reagent spray concentration contour plot is also provided at FIG. 6 for the same exhaust flow rate and reagent injection rate. Both of the plots of FIGS. 5 and 6 relate to exhaust flow and reagent injection within a cylindrical tube without a flow modifier.

FIG. 7 depicts a mass fraction of reagent contour for the same exhaust flow and reagent injection rates for a system equipped with a flow modifier shaped as diverter plate 172. A corresponding reagent spray concentration contour is shown at FIG. 8. A comparison of the contours generated without a flow diverter and the contours including diverter plate 172 illustrate the effect of increasing the exhaust velocity near reagent exit orifice 156. By increasing the velocity at the area where the reagent is initially injected, droplets of reagent are forced upwardly and/or further downstream prior to traversing the tube and impinging inner surface 106 opposite injector 16.

Additional computational estimates were generated regarding the concentration of injected reagent throughout passageway 106. In particular, an amount of reagent deposited on the lower half of the pipe wall surface was estimated at the 380 kg per hour exhaust flow rate with the reagent injection rate of approximately 4.2 g per minute. By installing flow modifier 164, the mass fraction of reagent deposited on the lower half of inner surface 106 was reduced more than 50 percent.

Further review of the computational fluid dynamics data reflects diverter plate 172 causing a flow separation at a leading edge 174 urging the exhaust flow to accelerate toward injector 16. At a trailing edge 176 of diverter plate 172 the exhaust flow velocity is increased by 25 percent in the area between diverter plate 172 and injector 16. Enhanced mixing and reduced reagent impingement results.

Figure 9:
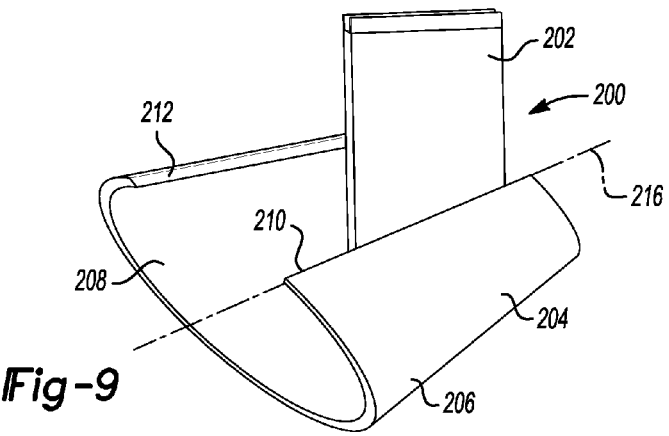
FIG. 9 is fragmentary perspective view of a semi-cone flow modifier.

FIG. 9 depicts an alternate flow modifier 200. As previously discussed in relation to flow modifier 164, flow modifier 200 may be fixed to an injector mount or may be separately spaced apart from injector 16 and coupled to tube 102. Flow modifier 200 includes a post 202 having a substantially planar shape radially extending into passageway 104. A semi-cone flap 204 is fixed to post 202. Semi-cone flap 204 includes a partially conically shaped outer surface 206 spaced apart from a partially conically shaped inner surface 208. Semi-cone flap 204 terminates at a first edge 210 and a second edge 212. First edge 210 is spaced apart from second edge 212 to allow post 202 to pass therebetween. An axis of rotation 216 of outer conical surface 206 extends at an angle to the direction of exhaust flow through passageway 104 to increase the velocity of the exhaust flow near injector 16. CFD analysis indicates favorable reagent and exhaust mixing as well as reduced reagent impingement on inner surface 106 opposite injector 16.

Figure 10:
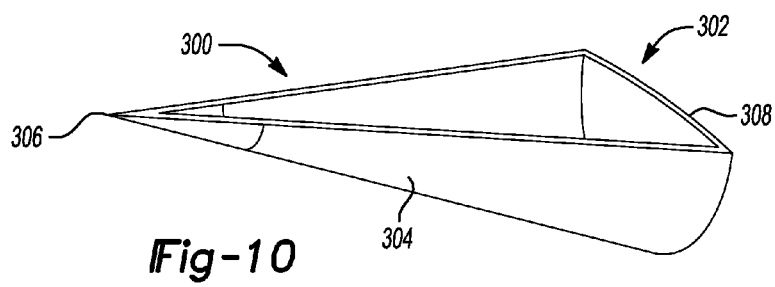
FIG. 10 is fragmentary perspective view of a wedge flap flow modifier.

Another alternate flow modifier is identified at reference numeral 300 as shown in FIG. 10. Flow modifier 300 includes a wedge-shaped flap 302 inwardly protruding from inner surface 106 upstream from injector 16. Wedge flap 302 includes a conically shaped wall 304 beginning at a point 306 and terminating at a substantially planar panel 308. Wedge flap 302 also serves to modify the exhaust gas velocity profile upstream from injector 16 to enhance mixing and reduce reagent impingement on inner surface 106.

Figures 11, 12, 13:
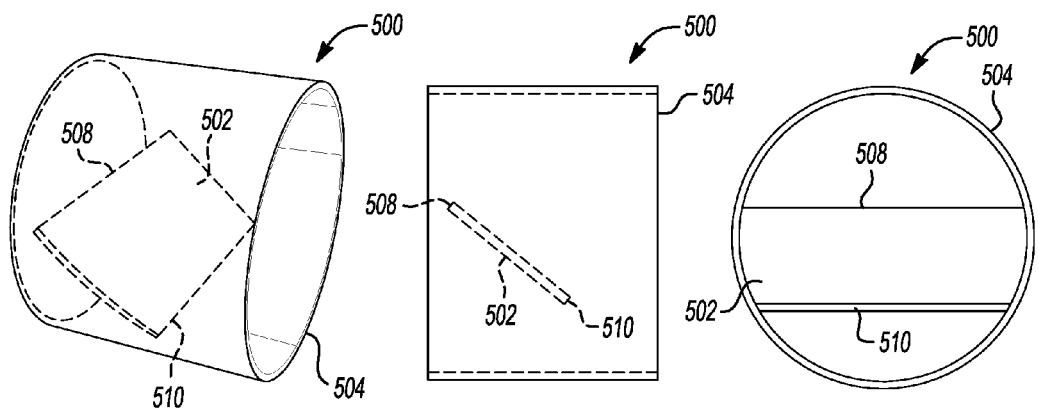
FIG. 11 is fragmentary perspective view of another alternate pre-injection flow modifier.
FIG. 12 is cross-sectional side view of the flow modifier depicted in FIG. 11.
FIG. 13 is an end view of the flow modifier depicted in FIG. 11.
Figure 19:
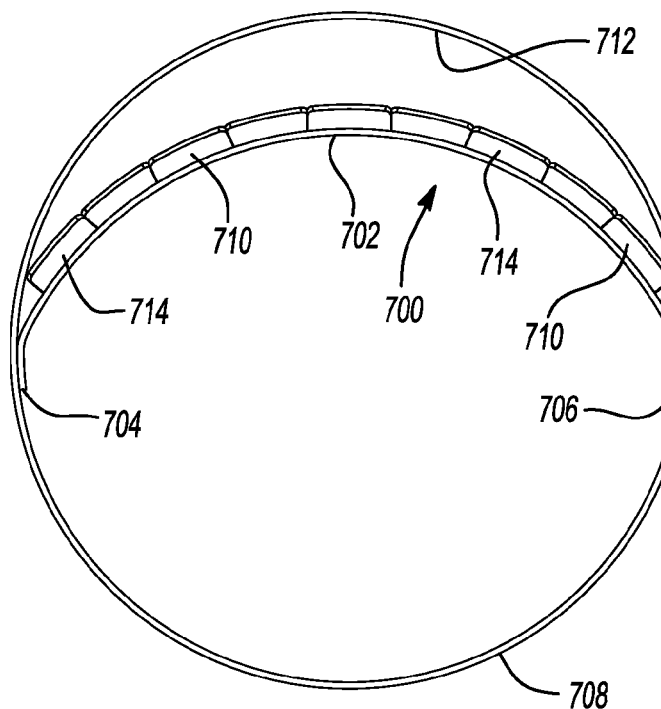
FIG. 19 is a front view of an exhaust conduit including the flow modifier illustrated in FIG. 17.

FIGS. 11-13 depict another type of flow modifier identified at reference numeral 500. Flow modifier 500 is shaped as a substantially planar plate 502 fixed within a substantially cylindrical tube 504. Plate 502 is inclined in the opposite direction than that of diverter plate 172. In particular, an upstream edge 508 of plate 502 is positioned closer to injector 16 than a downstream edge 510 of plate 502. Exhaust flow is split as it traverses leading edge 508 such that the top portion of the flow will expand and slow down slightly, while the bottom portion of the flow will compress and cause an increase in velocity. The increased velocity at the lower portion of the pipe will sweep away reagent droplets reaching the lower portion of the pipe before evaporating. Accordingly, flow modifier 500 will reduce pipe wetting due to reagent impingement.

Provided that the angle at which plate 502 resides within tube 504 is steep enough, the top portion of the pipe will experience boundary layer detachment causing turbulence to assist reagent and exhaust mixing. In one embodiment, a post injection mixer such as that depicted in U.S. Pat. No. 8,141,353, which is hereby incorporated by reference, may be included. The turbulent flow entering the mixer will enhance the mixer's ability to distribute the reagent throughout the exhaust gas. As such, the mixing length may be shortened. Alternatively, by properly positioning plate 502 upstream from injector 16, a post injection mixer may be eliminated.

FIG. 14 presents a velocity profile of the exhaust at four different axial positions downstream from inclined plate 502. The first velocity distribution is plotted at the trailing edge 510 of plate 502. The next profile to the right, as viewed in FIG. 14, depicts the exhaust gas velocity distribution at one inch axial distance downstream from trailing edge 520. The velocity distributions at a six inch offset distance and at a twelve inch offset distance are also shown. Based on the computational fluid dynamic modeling, injector 16 may be beneficially placed at an axial location aligned with trailing edge 510 or within approximately 1 inch of trailing edge 510 to take advantage of the increased velocity profile near inner surface 106 opposite injector 16.

It should also be appreciated that plate 502 may be fixed within tube 504 or may be moveably mounted therein. For the moveably mounted version, it is contemplated plate 502 may be pivotally coupled to tube 504 in a manner similar to the snap-action valve described in U.S. Pat. No. 7,434,570 herein incorporated by reference. Additional moveable valves are described in U.S. Pat. No. 7,775,322, U.S. Pat. No. 8,215,103 and U.S. Pat. No. 8,468,813 also herein incorporated by reference. Each of the references cited include a torsional spring and a passively actuated valve that rotates in relation to the pressure of the exhaust acting thereon. It is also contemplated that the present flow modifier may be actively controlled through the use of an actuator (not shown) operable to rotate plate 502 between a position substantially parallel to the direction of exhaust flow and the inclined position previously discussed.

FIGS. 15 and 16 depict a biased flow modifier 600 pivotally coupled to tube 602. Flow modifier 600 may be moved between deployed and retracted positions to minimize restriction to flow at higher exhaust flow rates. When the exhaust flow rate through tube 102 is sufficiently high, additional flow modification is not required to obtain adequate reagent mixing and avoidance of reagent impingement. At these higher exhaust gas flow rates, it may be beneficial to retract the flow modifier from its deployed position.

A torsion spring 604 biases a flap 606 toward the deployed position depicted in the figures. Flap 606 is curved to deflect exhaust flow away from injector 16 and increase the exhaust velocity adjacent inner surface 608 opposite injector 16. When the exhaust flow rate reaches a predetermined magnitude, the force on an upstream surface 610 of flow modifier 600 overcomes the biasing force of spring 604, thereby causing flap 606 to move toward the retracted position adjacent inner surface 608. When flow modifier 600 is in the retracted position, restriction to exhaust flow is minimized. Any increase in back pressure due to the use of flow modifier 600 will be minimized.

FIG. 17 illustrates another flow modifier 700 according to a principle of the present disclosure. Flow modifier 700 is a curved plate 702 including a first edge 704 and a second edge 706 fixed to exhaust tube 708 such that plate 702 is suspended within exhaust tube 708 at a position located upstream from injector 16. Although plate 702 is illustrated as being curved, plate 702 may be substantially planar without departing from the scope of the present disclosure. A plurality of louvers 710 may be formed in plate 702 to direct the exhaust flow in a desired direction. In the illustrated embodiment, flow modifier is fixed to exhaust tube 708 at an upper portion 712 thereof (i.e., on the same side of tube 708 as injector 16). As the exhaust flow approaches flow modifier 700, louvers 710 will direct the exhaust flow in a downward direction away from injector 16. In this manner, droplets of the reagent exhaust treatment fluid may be prevented from reaching the lower portion 713 of tube 708 and pooling or forming deposits thereon.

Alternatively, flow modifier 700 can be fixed to exhaust tube 708 at lower portion 713 thereof (FIG. 18). Louvers 710 will then direct the exhaust flow upward and toward the injector 16. Regardless where flow modifier 700 is positioned, the increase in velocity and swirl induced by louvers 710 will intermingle the reagent exhaust treatment fluid with the exhaust stream such that deposit formation is prevented, or at least substantially minimized. Further, it should be understood that flow modifier 700, whether positioned at upper portion 712 or lower portion 713, can include louvers 710 oriented in the opposite configuration as that illustrated. That is, when flow modifier 700 is positioned at upper portion 712 of tube 708, louvers 710 can be oriented to direct the exhaust flow toward the injector 16. Alternatively, when flow modifier 700 is positioned at lower portion 712 of tube 708, louvers 710 can be oriented to direct the exhaust flow away from injector 16. Another alternative is to have louvers 710 oriented in each direction, whether flow modifier 700 is positioned at either the upper portion 712 or lower portion 713 of tube 708.

Figure 20:
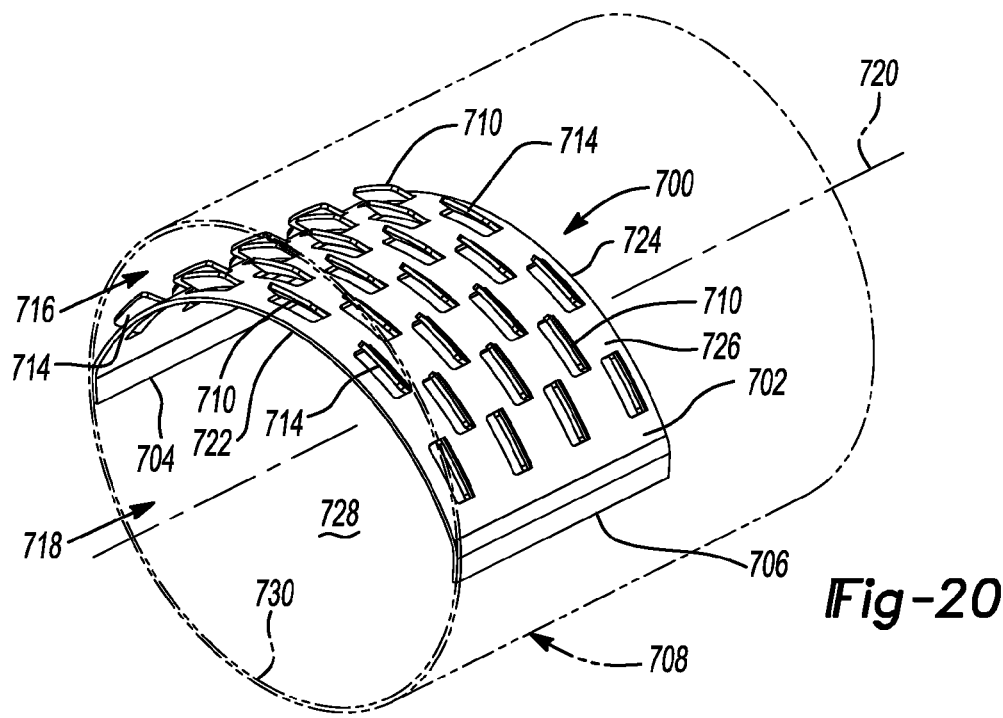
FIG. 20 is a perspective view of an exhaust conduit including the flow modifier illustrated in FIG. 17.

Louvers 710 may be tuned as desired. For example, louvers 710 can be in the form of tabs 714 punched from plate 702. Tabs 714 can each include different lengths, which allows for tailoring a target non-uniform flow distribution of the exhaust. Alternatively, louvers 710 can have any shape desired by one skilled in the art. For example, louvers 710 can be oval, round, triangular, and the like without departing from the scope of the present disclosure. Furthermore, louvers 710 can be slightly helically twisted to induce a greater amount of swirl in the exhaust flow that assists in intermingling the reagent exhaust treatment fluid with the exhaust. As best shown in FIG. 20, louvers 710 are staggered over plate 702, which allows for an increased amount of exhaust flow to be re-directed by flow modifier 700.

FIG. 20 also depicts plate 702 dividing the exhaust stream into a first portion 716 and a second portion 718. First edge 704 and second 706 extend substantially parallel to one another and parallel to a longitudinal axis 720 of exhaust tube 708. Plate 702 includes a leading edge 722, a trailing edge 724, and a convex surface 726. Plate 702 is positioned within an interior 728 of exhaust tube 708. Exhaust tube 708 includes an inner surface 730.

Flow modifier 700 should not be limited to being positioned upstream from injector 16. Flow modifier 700, rather, may be positioned directly beneath injector 16, or may be positioned downstream from injector 16. When flow modifier 700 is positioned directly beneath injector 16, large droplets of the reagent exhaust treatment fluid that do not immediately atomize and intermingle with the exhaust may impinge upon plate 702. Although the large droplets may impinge on plate 702, because flow modifier 700 is suspended within tube 708, the droplets are subjected to higher velocity exhaust flow that generally causes the droplets to sublimate rather than form deposits.

In addition, it should be understood that flow modifier 700 should not be limited to use in conjunction with injector 16. In contrast, it should be understood that injector 16 can be replaced by, for example, NOx sensor 25, a temperature sensor, pressure sensor, or the like. Use of flow modifier 700 in conjunction with a sensor allows for a non-uniform flow of the exhaust as it approaches the sensor, which can provide more accurate readings on exhaust temperature, NOx concentration, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust gas treatment system for reducing emissions from an engine, the system comprising:
    an exhaust treatment device;
    an exhaust conduit adapted to supply an exhaust stream from the engine to the exhaust treatment device, the conduit including an aperture;
    an injector for injecting a reagent through the aperture and into the exhaust stream;
    a flow modifier positioned within the exhaust conduit, the flow modifier including a plate having a first end and a second end that are fixed to opposing sides of the exhaust conduit to suspend the plate within the exhaust conduit, wherein a majority of the plate is spaced apart from the exhaust conduit to at least partially define a gap therebetween and divide the exhaust stream into first and second portions, the plate further including a plurality of tabs extending from the plate and being inclined in a direction to direct the first portion of the exhaust stream in one of a direction toward or a direction away from the injector;
    wherein the tabs extend from the plate and include a shape corresponding to a shape of an adjacent aperture; and
    wherein the flow modifier is positioned upstream from the injector and the aperture adjacent to one of the tabs is positioned upstream from the same tab.

2. The exhaust gas treatment system of claim 1, wherein the plate includes first and second edges on opposite ends of the plate, the first and second edges extending parallel to one another and parallel to a longitudinal axis of the exhaust conduit.

3. The exhaust gas treatment system of claim 1, wherein the flow modifier is suspended on a same side of the exhaust conduit as the injector.

4. The exhaust gas treatment system of claim 1, wherein the flow modifier is suspended on an opposing side of the exhaust conduit as the injector.

5. The exhaust gas treatment system of claim 1, wherein the plate is curved and includes a radius larger than a radius of an inner surface of the exhaust conduit.

6. The exhaust gas treatment system of claim 1, wherein the plate is curved and circumferentially extends along an interior of the conduit 180 degrees.

7. An exhaust gas treatment system for reducing emissions from an engine, the system comprising:
    an exhaust treatment device;
    an exhaust conduit adapted to supply an exhaust stream from the engine to the exhaust treatment device;
    a sensor in communication with the exhaust conduit;
    a flow modifier positioned within the exhaust conduit proximate the sensor, the flow modifier including a plate having a first end and a second end that are fixed to opposing sides of the exhaust conduit to suspend the plate within the exhaust conduit, the plate including a convex surface extending across the exhaust conduit between the opposing sides, a majority of the convex surface being spaced apart from the conduit, the plate further including a leading edge and trailing edge with respect to a direction of exhaust gas flow as well as a plurality of tabs extending from the plate that direct the exhaust stream toward the sensor.

8. The exhaust gas treatment system of claim 7, wherein the plate is curved with a radius greater than an inside radius of the exhaust conduit.

9. The exhaust gas treatment system of claim 7, wherein the tabs are positioned between the leading and trailing edges.

10. The exhaust gas treatment system of claim 7, wherein the tabs are positioned adjacent to apertures extending through the plate.

11. The exhaust gas treatment system of claim 7, wherein the flow modifier is positioned upstream from the sensor.

12. The exhaust gas treatment system of claim 7, wherein the flow modifier is suspended on a same side of the exhaust conduit as the sensor.

13. The exhaust gas treatment system of claim 7, wherein the flow modifier is suspended on an opposing side of the exhaust conduit as the sensor.

14. The exhaust gas treatment system of claim 7, wherein the tabs are staggered over a face of the plate.

15. The exhaust gas treatment system of claim 7, wherein the plate terminates at first and second edges that extend parallel to one another and parallel to a longitudinal axis of the conduit.

* * * * *